United States Patent
Hofmeister et al.

[11] 3,894,004
[45] July 8, 1975

[54] NOVEL 11-OXYGENATED PREGNENO (17,16α-D)-1,3-OXATHIOLANES AND PROCESS FOR THE PREPARATION THEREOF

[75] Inventors: Helmut Hofmeister; Henry Laurent; Klaus Prezewowsky; Rudolf Wiechert; Klaus Mengel; Hans Wendt, all of Berlin, Germany

[73] Assignee: Schering Aktiengesellschaft, Berlin, Germany

[22] Filed: Dec. 20, 1973

[21] Appl. No.: 426,600

[30] Foreign Application Priority Data
Dec. 22, 1972   Germany............................ 2264001

[52] U.S. Cl...................... 260/239.5; 260/397.45 J
[51] Int. Cl.².......................................... C07C 173/00
[58] Field of Search ...../Machine Searched Steroids; 260/239.5, 239.55 D

[56] References Cited
UNITED STATES PATENTS
3,170,920   2/1965   Komeno et al. ............... 260/239.55
3,770,726   11/1973  Hofmeister et al. ........ 260/239.55 D Primary Examiner—Elbert L. Roberts
Attorney, Agent, or Firm—Miller, Raples & White

[57] ABSTRACT
Topical anti-inflamatory 11-oxygenated pregneno[17,16α-d]-1', 3'-oxathiolanes of the formula I

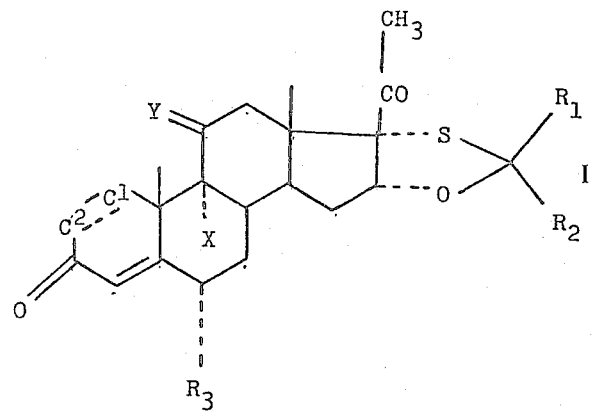

wherein $R_1$ and $R_2$, can be the same or different and are a hydrogen atom, an alkyl, a cycloalkyl, a cycloalkyl containing hetero atoms, aryl, or heteroacyl; $R_1$ and $R_2$ together can be a $(CH_2)_n$ bridge which can also contain hetero atoms, and wherein n has the values of 2–6; $R_3$ represents a hydrogen or fluorine atom, or an alkyl; X is a hydrogen, fluorine, or chlorine atom; Y is an oxygen atom or the group

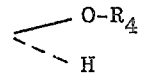

wherein $R_4$ represents a hydrogen atom or an acyl; and $C^1$ .... $C^2$ represents a single or double bond between the C-1 and C-2 carbon atoms. This invention also comprises the process of producing the compounds by condensation of 16β-hydroxy-17α-mercaptopregnenes with carbonyl compounds under epimerization of the substituent at the C-16 carbon atom.

14 Claims, No Drawings

NOVEL 11-OXYGENATED PREGNENO (17,16α-D)-1,3-OXATHIOLANES AND PROCESS FOR THE PREPARATION THEREOF

BACKGROUND OF THE INVENTION

This invention relates to novel 11-oxygenated pregneno [17,16α-d]-1',3'-oxathiolanes of the Formula I

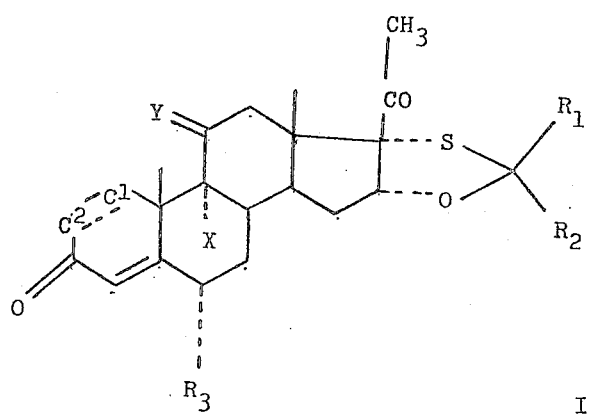

wherein $R_1$ and $R_2$ can be the same or different and are a hydrogen atom or alkyl which also can be optionally substituted, a cycloalkyl which also can be optionally substituted and/or can contain hetero atoms, or an aryl or heteroaryl which also can be optionally substituted, and $R_1$ and $R_2$ together can represent a $(CH_2)_n$ bridge which also can be interrupted by hetero atoms and wherein n has the value of 2–6; $R_3$ represents a hydrogen or fluorine atom or alkyl; X represents a hydrogen, fluorine, or chlorine atom; Y represents an oxygen atom, or the group

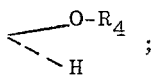

wherein $R_4$ represents a hydrogen atom or an acyl group; and $C^1 \doteq C^2$ represents a single or double bond between the C-1 and C-2 carbon atoms.

SUMMARY OF THE INVENTION

This invention relates to the novel 11-oxygenated pregneno [17,16α-d]-1',3'-oxathiolanes of the Formula I and to a process for preparing them by condensation of 16β-hydroxy-17α-mercaptopregnenes with carbonyl compounds under epimerization of the substituent at the C-16 carbon atom. The progression of the process is not affected by the respective values given for X, Y, and $C^1 \doteq C^2$. Thus, it is possible to utilize in the reaction mechanism those starting compounds containing X, Y, and/or $C^1 \doteq C^2$ in the finally desired significance, as well as to introduce X, Y, and/or the $C^1 \doteq C^2$ double bond subsequently into the steroid skeleton of the reaction products.

DETAILED DISCUSSION

Suitable alkyl groups for $R_1$, $R_2$ and $R_3$ in general Formula I are straight- and branched-chain, preferably lower alkyl, of 1–5 carbon atoms, e.g., methyl, ethyl, propyl, butyl, tert.-butyl, pentyl. Especially preferred as the alkyl is methyl. The alkyls can also be unsaturated. Suitable substituents for the alkyls include, but are not limited to, halogen atoms, hydroxy; amino; nitro; alkoxy; cycloalkyl, which also can contain optionally hetero atoms; aryl; or heteroaryl.

Preferred cycloalkyls are those of 3–8 carbon atoms, e.g., cyclopropyl, cyclobutyl, cyclopentyl, cyclohexyl, cycloheptyl, and cyclooctyl, and especially preferred are cyclopentyl and cyclohexyl. Suitable substituents for the cycloalkyl groups are, inter alia, halogen atoms. The hetero atoms which can be contained in the cycloalkyl or in the $(CH_2)_n$ bridge are preferably oxygen, nitrogen, or sulfur atoms.

When halogen atoms are indicated in the values given, they are preferably fluorine, chlorine, or bromine atoms.

Suitable aryls are monocyclic aryls, preferably phenyl, which also can be substituted in the ortho, meta, or para position. Suitable substituents include but are not limited to, hydroxy, amino, nitro, alkyl, and alkyloxy, and halogen atoms.

The heteroaryls can be monocyclic heteroaryls which can also be substituted. Suitable substituents include but are not limited to hydroxy, amino, nitro, alkyl, and alkoxy groups, and halogen atoms. Heteroaryls containing 5 or 6 carbon atoms are preferred, e.g., furyl, furfuryl, pyrrolyl, pyranyl, pyridyl and particularly thienyl or thenyl.

Acyls are those of physiologically compatible acids. Preferred acyls are those derived from lower carboxylic acids, particularly those of 1–4 carbon atoms, e.g., acetic or butyric acid.

Among the compounds of the pregnane series which have an oxygen function at the C-11 carbon atom, no compounds have been heretofore known which additionally have a sulfur function at the C-17 carbon atom.

It has now been found that the novel compounds of the present invention possess excellent therapeutically valuable properties. In particular, they are distinguished by a strongly topical anti-inflammatory activity and exhibit a superior effectiveness as compared to the analogous compounds having an oxygen function at the C-17 carbon atom. The special advantage is that the superior topical effectiveness is accompanied by a reduced systemic side effect.

The anti-inflammatory activity of the novel compounds was determined by the vasoconstriction test on experimentally hyperemized human skin. The vasoconstriction test utilized to show clinically the high activity of the compounds of this invention as topical anti-inflammatory agents was conducted as follows: On the backs of volunteers, the stratum corneum was divided by the application and tearing off of an adhesive film having a width of 2 cm., which application was conducted 20 times at the same spot. As a result, a pronounced hyperemia was thus produced. Then, within the stripped area, under the same application of pressure, approximately 50 mg. of a water/oil salve base containing, in each case, respectively, 0.1% of the compound being tested, were applied to marked 4 cm² areas. The backs of the patients were then photographed at specific intervals with color film (Kodak). In order to evaluate hyperemia and vasoconstriction, the color of the individual zones of the skin on the Kodak color film were translated into brightness values. This was done by projecting sections of the color film through a perforated screen on an interference filter. Such sections differ from one another in brightness, depending on the degree of vasoconstriction obtained at that section. As the brightness indicator, a secondary electron multiplier was employed, and for determining the chromaticity value, the anode current of the secondary electron multiplier was measured. To determine the vasoconstriction effect, which is a representative syndrome of topical anti-inflammatory effectiveness, there was measured onset of effect, degree of effectiveness, and duration of effect. The chromaticity value of the treated and untreated stripped skin was determined and compared with the chromaticity value of the normal skin, the chromaticity value of the normal skin being assigned the value 100 and the chromaticity value of the untreated stripped skin was assigned the value 0. Slight, medium, and high vasoconstriction effects were evaluated between 0 and 100.

The superior effect of the compounds of this invention can be seen from the example of comparing the novel compound 11β-hydroxy-2',2'-dimethyl-1,4-pregnadieno[17,16α-d]-1',3'-oxathiolane-3,20-dione (1) with the analogous compound having an oxygen function at the C-17 carbon atom, namely the conventional 11β-hydroxy-2',2'-dimethyl-1,4-pregnadieno[17,16α-d]-1',3'-dioxolane-3,20-dione (2) (Table 1).

TABLE I

| No. Name | Concentration | Number of Test Persons | Degree of Vasoconstriction After: 1 hour | 4 hrs. |
|---|---|---|---|---|
| 1. 11β-hydroxy-2',2'-dimethyl-1,4-pregnadieno[17,16α-d]-1',3' oxathiolane-3,20-dione | 0.1 | 7 | 60 | 80 |
| 2. 11β-hydroxy-2',2'-dimethyl-1,4-pregnadieno[17,16α-d]-1',3'-dioxolane-3,20-dione | 0.1 | 7 | 40 | 65 |

The test results set forth in Table 1 show clearly that the local inflammation process regresses more rapidly with the use of the effective agents of this invention than with the use of the comparison substance. It is to be noted that the intensity of effectiveness of the novel agents during treatment is in all cases higher than in case of the conventional test substance.

Furthermore, the compounds of the present invention have a lower effect than the comparison substance in the adjuvant edema test, which is a measure for the systemic effect of a corticoid. For this reason, they are substantially better for the suitable treatment of inflammations than the known corticoids. Thus, these compounds can be utilized advantageously in those persons where the topical treatment with conventional corticoids should be avoided in view of the systemic side effect. Generally, the compounds of the invention are dispensed in a pharmaceutical carrier, the amount is about 0.005 mg to 50 mg preferably about 0.03 mg to 30 mg of active agent of this invention per 0.1 mg to 300 mg of pharmaceutical carrier.

The novel compounds are suitable, in combination with the vehicles customary in galenic pharmacy, e.g., for the local treatment of contact dermatitis, eczemas of various kinds, neurodermatities, erythrodermia, burns, pruritus vulvae et ani, rosacea, erythematodes cutaneus, psoriasis, lichen ruber planus et verrucosus, and similar skin deseases.

The special medicinal agents are prepared in accordance with methods with which a person skilled in the art is familiar, by converting the effective agents with suitable additives into the desired forms of application, such as, for example, solutions, lotions, ointments, creams, plaster, etc. In the thus-formulated drugs, the effective agent concentration is dependent on the mode of administration. In case of lotions and ointments, an effective agent concentration of 0.001–1% is preferably employed.

In the process for the preparation of 11-oxygenated pregneno[17,16α-d]-1',3'-oxathiolanes of the general Formula I, in accordance with this invention, 16β-hydroxy-17α-mercaptopregnenes of the general Formula II

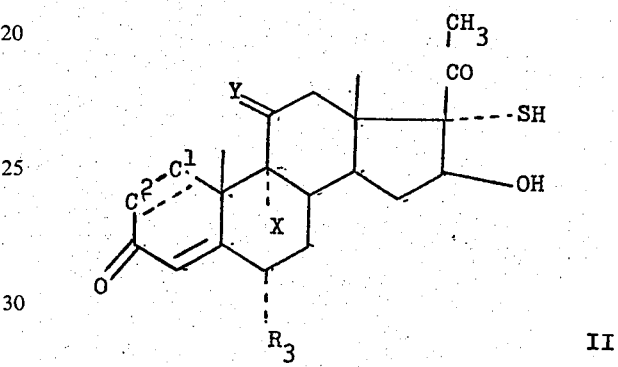

wherein $R_3$, X, Y, and $C^1 \ldots C^2$ have the same values given in Formula I, are condensed with carbonyl compounds of the general Formula III $$O = C \diagup^{R_1}_{R_2} \qquad III$$

wherein $R_1$ and $R_2$ have the same values give in Formula I, in the presence of an acidic catalyst; and, depending on the desired values of X, Y, and $C^1 \ldots C^2$, an 11-OH group is optionally acylated in a conventional manner, or an 11-OH group is oxidized, or an 11-O acyl group is hydrolyzed and/or a fluorine or chlorine atom is introduced in the 9-position, and/or a double bond is introduced in the 1-position.

The catalysts for the condensation are strong acids; e.g., concentrated hydrochloric acid, sulfuric acid, p-toluenesulfonic acid, perchloric acid, boron trifluoride etherate, boron trichloride, and similar compounds. Preferred acids are oxo acids, such as perchloric acid, sulfuric acid, etc. In general, minor amounts of these catalytically effective acids are sufficient to conduct the reaction in the desired manner. However, larger amount of catalyst do not impair the reaction.

In the condensation of the 16,17-mercaptohydrin of the general Formula II with the carbonyl compound III to be employed in this process, the latter generally serves as the reactant as well as the solvent. However, this is not to exclude effecting the reaction in the presence of an additional inert solvent and/or diluent or solubilizer, such as, e.g., dioxane, tetrahydrofuran, glyme or diglyme, or chlorinated hydrocarbons, and under certain circumstance, also in a suspension. Carbonyl compounds which can be utilized in connection with this process are formaldehyde, acetone, acetaldehyde, methyl ethyl ketone, methyl butyl ketone, ethyl butyl ketone, methyl benzyl ketone, cyclopropanone, cyclobutanone, cyclopentanone, cyclohexanone, cycloheptanone, benzaldehyde, halogenated benzaldehydes such as p-chlorobenzaldehyde, alkoxybenzaldehydes such as o-anisaldehyde hydroxybenzaldehydes such as salicylaldehyde lower alkylbenzaldehydes such as m-tolualdehyde and p-ethylbenzaldehyde, nitrobenzaldehydes, aminobenzaldehydes, phenylacetaldehyde, $\alpha$-phenylpropionaldehyde, $\beta$-phenylpropionaldehyde, $\gamma$-phenylbutyraldehyde, picolinaldehydes, furfurol, thiophenaldehydes, propiophenone, butyrophenone, valerophenone, acetophenone, p-fluoroacetophenone, p-chloroacetophenone, p-hydroxyacetophenone, alkoxyphenylalkyl ketones with lower alkoxy and alkyl groups such as p-anisyl methyl ketone, 1-phenyl-3-butanone and 1-phenyl-4-pentanone, 2-benzoylfuran, 2-acetylthiophene, and pyridinaldehydes. Also suitable are unsaturated carbonyl compounds such as acrolein.

The reaction is initiated by combining the reactants and the condensation proper takes place generally under very gentle reaction conditions, for example at −10°C. to 35° C. Normally, room temperature or a slightly elevated reaction temperature, and a reaction time of about 1–8 hours are sufficient. This, however, does not exclude the use of elevated reaction temperatures and/or prolonged reaction times.

If the substituents $R_1$ and $R_2$ in the carbonyl compounds used for the condensation are not the same, epimeric mixtures are formed, the components of which are separated by the usual methods, e.g., chromatography and/or recystallization.

The optional measures are effected in accordance with methods known to a person skilled in the art. The following examples are set forth :

a. for the acylation of the 11-OH group : the reaction with the acid anhydrides in the presence of acidic esterification catalysts, such as p-toluenesulfonic acid, perchloric acid, trifluoroacetic acid;

b. for the oxidation of the 11-OH group : the reaction with chromium (VI) oxide in the presence of acids, such as sulfuric acid or acetic acid, and bases, such as pyridine; and the reaction with N-bromoamides and-imides, such as N-bromoacetamide, in the presence of bases, such as pyridine;

c. for the hydrolysis of the 11-Oacyl group : the reaction with bases, such as, for example, with alkali metal hydroxide, alcoholate, or carbonate, in the presence of water, preferably in an alcoholic solution, optionally with the addition of a solubilizer;

d. for the introduction of a fluorine or chlorine atom in the 9-position: the dehydration of the 11$\beta$-hydroxy compound to the $\Delta^{9(11)}$ steroid, e.g., by means of sulfonic acid halogenides, such as thionyl chloride, mesyl chloride, or tosyl chloride, with subsequent conversion into the 9,11-halohydrin, e.g. by reaction with N-bromosuccinimide in dioxane and water, and into the 9$\beta$,11$\beta$-epoxide, e.g., by treatment with basic reagents, such as sodium hydroxide, potassium carbonate, potassium acetate, pyridine, and others, the 9,11-oxido ring of which is then opened with hydrogen fluoride or hydrogen chloride to the finally desired 11$\beta$-hydroxy-9$\alpha$-fluoro (chloro) grouping;

e. for the introduction of the chlorine atom in the 9-position : the dehydrogenation of the 11$\beta$-hydroxy compound to the $\Delta^{9(11)}$ steroid with subsequent reaction with hypochlorous acid or with reagents liberating hypochlorous acid in the presence of water and in an acidic medium, for example N-chlorosuccinimide;

f. for the introduction of the $\Delta^1$-double bond: the reaction with chloranil or 2,3-dichloro-5,6-dicyano-1,4-benzo-quinone or the dehydrogenation with selenium compounds, e.g., selenium dioxide or selenic acid, or the microbiological $\Delta^1$-introduction.

The 16$\beta$-hydroxy-17$\alpha$-mercapto-pregnene starting compounds of Formula II utilized in accordance with the process of the invention are also not disclosed in the literature. These compounds are prepared in accordance with conventional methods, wherein the 17$\alpha$-mercapto group is introduced via the 16$\beta$,17-epoxy steroids analogously to the subsequent processes indicated in (A) through (D). The introduction of the double bond in the 1-position, as well as the hydrolysis, acylation, or oxidation of the substituents at the C-11 carbon atom and the introduction of a fluorine or chlorine atom in the 9-position are effected according to methods generally known to one skilled in the art, for example, according to the methods set forth above, wherein the steroids used as the starting compounds can contain any other desired groups inert with respect to the reagent. The compounds are obtained, in part, in an oily form and are generally utilized in the form of the crude products for preparing the compound of general Formula I. The following examples describe the preparation of 16$\beta$-hydroxy-11$\beta$-acetoxy-17$\alpha$-mercapto-1,4-pregnadiene-3,20-dione (A), 9-fluoro-11$\beta$,16$\beta$-dihydroxy-17$\alpha$-mercapto-4-pregnene-3,20-dione (B), 6$\alpha$-fluoro-11$\beta$,16$\beta$-dihydroxy-17$\alpha$-mercapto-1,4-pregnadiene-3,20-dione (C), and 11$\beta$,16$\beta$-dihydroxy-17$\alpha$-mercapto-6$\alpha$-methyl-1,4-pregnadiene-3,20-dione (D):

A. One gram of 11$\beta$,21-diacetoxy-1,4,16-pregnatriene-3,20-dione is stirred for 3 hours at room temperature with 600 mg. of zinc dust in 40 ml. of glacial acetic acid. After the zinc dust has been filtered off, the solution is stirred into ice water. the precipitate is vacuum-filtered, dried, and recrystallized from acetone/hexane, thus obtaining 383 mg. of 11$\beta$-acetoxy-1,4,16-pregnatriene-3,20-dione, m.p. 239°–241° C.

A solution of one gram of 11$\beta$-acetoxy-1,4,16-pregnatriene-3,20-dione in a mixture of 75 ml. of tert.-butanol and 15 ml. of water is mixed with 0.2 ml. of 70% strength perchloric acid and cooled to 0° C. Then, one gram of N-bromosuccinimide is added and the mixture agitated at room temperature for 5 hours. The reaction solution is stirred into ice water, the precipitate is vacuum-filtered and taken up in methylene chloride. The solution is washed successively with sodium thiosulfate solution and water. After recrystallization from acetone/hexane, 490 mg. of 17-bromo-16$\beta$-hydroxy-11$\beta$-acetoxy-1,4-pregnadiene-3,20-dione is obtained, m.p. 156° C. (decomposition).

1.7 g. of 17-bromo-16$\beta$-hydroxy-11$\beta$-acetoxy-1,4-pregnadiene-3,20-dione is stirred in 15 ml. of dimethylformamide with 1.5 g. of potassium acetate for 4 hours at 60° C. The reaction mixture is stirred into ice water, the precipitate is vacuum-filtered, dried, and recrystallized from acetone/hexane, thus obtaining 1.0 g. of 11β-acetoxy-16β,17-epoxy-17 α-pregna-1,4-diene-3,20-dione, m.p. 175°–176° C.

660 mg. of 11β-acetoxy-16β,17-epoxy-17α-pregna-1,4-diene-3,20-dione is combined in 50 ml. of glacial acetic acid with 500 mg. of p-toluenesulfonic acid. The solution is saturated with hydrogen sulfide and allowed to stand at room temperature for 12 hours. The reaction mixture is stirred into ice water, the precipitate is vacuum filtered and dried. After chromatography on silica gel with 6.4 – 7.2% acetone/methylene chloride and recrystallization from acetone/hexane, 153 mg. of 16β-hydroxy-11β-acetoxy-17α-mercapto-1,4-pregnadiene-3,20-dione is obtained, m.p. 171°–173°C.

B. At -10° C., 38 ml. of acetic anhydride is mixed with 20 ml. of concentrated nitric acid. Under agitation, 5 g. of 9-fluoro-11β,17-dihydroxy-21-acetoxy-4-pregnene-3,20-dione is added to this mixture. The latter is allowed to stand at −10° C. for 27 hours and then poured into ice water. The precipitate is vacuum-filtered, washed with water, and dried. After chromatography with 22.4 – 24.4% acetone/hexane and recrystallization from acetone/hexane, 3.8 g. of 9-fluoro-11β,17-dinitryloxy-21-acetoxy-4-pregnene-3,20-dione is produced, m.p. 154°–156° C. (decomposition).

3 g. of 9-fluoro-11β,17-dinitryloxy-21-acetoxy-4-pregnene-3,20-dione is agitated under a nitrogen atmosphere with 1.5 g. of anhydrous potassium acetate in 60 ml. of dimethylformamide for 15 minutes at 100° C. The reaction mixture is stirred into ice water, the precipitate is vacuum-filtered, washed with water, and dried. After chromatography with 22.5 – 27% acetone/hexane and recrystallization from acetone/hexane, 1.4 g. of 9-fluoro-11β-nitryloxy-21-acetoxy-4,16-pregnadiene-3,20-dione is obtained, m.p. 180° C. (decomposition).

26 g. of 9-fluoro-11β-nitryloxy-21-acetoxy-4,16-pregnadiene-3,20-dione is stirred with 25 g. of zinc dust in 500 ml. of glacial acetic acid for 1 hour at 5° C. After the zinc dust has been filtered off, the filtrate is poured into ice water and the precipitate is worked up; the thus-obtained mixture of substances made up of 9-fluoro-11β,20α-dihydroxy-4,16-pregnadien-3-one (m.p. 218° – 219.5° C.) and 9-fluoro-11β-hydroxy-4,16-pregnadiene-3,20-dione (17 g.) as the crude product is agitated, for oxidation purposes, with 16 g. of active pyrolusite in 800 ml. of methylene chloride for 5 hours at room temperature. The pyrolusite is then filtered off, the filtrate stirred into ice water, the precipitate vacuum-filtered, washed, and dried. After recrystallization from acetone/hexane, 7.9 g. of 9-fluoro-11β-hydroxy-4,16-pregnadiene-3,20-dione is obtained, m.p. 204°/210°–215°C.

A solution of 10 g. of 9-fluoro-11β-hydroxy-4,16-pregnadiene-3,20-dione in 200 ml. of tert.-butanol and 20 ml. of water is mixed with 1 ml. of 70% strenght perchloric acid and cooled to 0° C. Thereafter, 10 g. of N-bromosuccinimide is added under agitation, and the solution is warmed to room temperature. After 3 hours, the reaction solution is poured into ice water, the precipitate is vacuum-filtered, and worked up. After chromatography on silica gel with 8% acetone/methylene chloride, 5.6 g. of 9-fluoro-17-bromo-11β,16β-dihydroxy-4-pregnene-3,20-dione is produced in the form of an oil.

5.4 g. of 9-fluoro-17-bromo-11β,16β-dihydroxy-4-pregnene-3,20-dione is stirred in 108 ml. of ethanol and 54 ml. of acetone with 5.4 g. of potassium carbonate at room temperature for 2 hours. After precipitation by pouring the mixture into ice water, the precipitate is vacuum-filtered and dried. By recrystallization from acetone/hexane, 3.4 g. of 9-fluoro-11β-hydroxy-16β,17-epoxy-17α-pregn-4-ene-3,20-dione is produced, m.p. 172°/174°–177°C.

2.1 g. of 9-fluoro-11β-hydroxy-16β,17-epoxy-17α-pregn-4-ene-3,20-dione is combined in 100 ml. of glacial acetic acid with 1.2 g. of p-toluenesulfonic acid. The solution is then saturated with H₂S gas, the reaction mixture is allowed to stand for 2 hours at room temperature, and is then stirred into ice water. The precipitate is vacuum-filtered and taken up in ethyl acetate; the solution is dried over sodium sulfate. After fchromatography on silica gel with 10–13% acetone/methylene chloride and recrystallization from acetone/hexane, 0.5 g. of 9-fluoro-11β,16β-dihydroxy-17α-mercapto-4-pregnene-3,20-dione is obtained, m.p. 178°C. (decomposition).

C. : Five grams of 6α-fluoro-11β-hydroxy-4,16-pregnadiene-3,20-dione is refluxed in 80 ml. of dioxane with 5 g. of 2,3-dichloro-5,6-dicyano-1,4-benzoquinone for 10 hours. The solvent is distilled off under vacuum; the residue is washed repeatedly with dilute sodium hydroxide solution and taken up in ether. After chromatography on silica gel with acetone/methylene chloride, 1.5 g. of 6α-fluoro-11β-hydroxy-1,4,16-pregnatriene-3,20-dione is isolated; this compound is dissolved, as the crude product, in a mixture of 75 ml. of tert.-butanol and 15 ml of water, mixed with 0.2 ml. of 70% perchloric acid, and cooled to 0°C. Subsequently, 1.5 g. of N-bromosuccinimide is added thereto. After 8 hours, the reaction solution is stirred into ice water; the precipitate is vacuum-filtered and taken up in methylene chloride. The solution is washed successively with sodium thiosulfate solution and water and dried. After chromatography on silica gel with 5–7% acetone/methylene chloride, 680 mg. of 6α-fluoro-17-bromo-11β,16β-dihydroxy-1,4-pregnadiene-3,20-dione is obtained as an oil.

600 mg. of 6α-fluoro-17-bromo-11β,16β-dihydroxy-1,4-pregnadiene-3,20-dione is reacted in 5 ml. of dimethylformamide with 500 mg. of potassium acetate within 3 hours at 60°C. The reaction mixture is stirred into ice water. The precipitate is vacuum-filtered and dried. After recrystallization from acetone/hexane, 350 mg. of 6α-fluoro-11β-hydroxy-16β,17-epoxy-17α-pregna-1,4-diene-3,20-dione is obtained, m.p. 153°–⅝° C.

300 mg. of 6α-fluoro-11β-hydroxy-16β,17-epoxy-17α-pregna-1,4-diene-3,20-dione is combined with glacial acetic acid while adding 250 mg. of p-toluenesulfonic acid. The solution is saturated with gaseous H₂S and allowed to stand at room temperature for 12 hours. The reaction mixture is stirred into ice water. The precipitate is vacuum-filtered and dried. After purification of the reaction product by preparative layer chromatography, 110 mg. of 6α-fluoro-11β,16β-dihydroxy-17α-mercapto-1,4-pregnadiene-3,20-dione is obtained.

D. : 4.3 g. of 11β-hydroxy-6α-methyl-4,16-pregnadiene-3,20-dione is refluxed for 8 hours in 80 ml. of dioxane with 5 g. of 2,3-dichloro-5,6-dicyano-1,4-benzoquinone. The solvent is distilled off under vacuum, the residue is washed repeatedly with dilute sodium hydroxide solution and taken up in ether. After chromatography on silica gel with acetone/methylene chloride, 2.1 g. of 11β-hydroxy-6α-methyl-1,4,16-pregnatriene-3,20-dione is produced; this compound, as the crude product, is dissolved in a mixture of 100 ml. of tert.-butanol and 20 ml. of water, mixed with 0.3 ml. of 70% perchloric acid, and cooled to 0° C. Then, the mixture is combined with 2 g. of N-bromosuccinimide and stirred for 7 hours at room temperature. The reaction solution is stirred into ice water, and the precipitate is vacuum-filtered. After chromatography of the crude product on silica gel with 6–8% acetone/methylene chloride, 1.1 g. of 17-bromo-11$\beta$,16$\beta$-dihydroxy-6$\alpha$-methyl-1,4-pregnadiene-3,20-dione is obtained in the form of an oil.

1.0 g. of 17-bromo-11$\beta$,16$\beta$-dihydroxy-6$\alpha$-methyl-1,4-pregnadiene-3,20-dione is stirred in 10 ml. of dimethylformamide with 1.0 g. of potassium acetate for 4 hours at 60° C. The reaction mixture is stirred into ice water, the precipitate is vacuum-filtered and recrystallized from acetone/hexane, thus obtaining 470 mg. of 16$\beta$,17-epoxy-6$\alpha$-methyl-17$\alpha$-pregna-1,4-diene-3,20-dione, m.p. 161°–165°C. (decomposition).

400 mg. of 16$\beta$,17-epoxy-6$\alpha$-methyl-17$\alpha$-pregna-1,4-diene-3,20-dione is mixed in 40 ml. of glacial acetic acid with 400 mg. of p-toluenesulfonic acid. The solution is saturated with gaseous $H_2S$ and allowed to stand for 12 hours at room temperature. The reaction mixture is stirred into ice water, the precipitate is vacuum-filtered and dried. After purifying the crude product by preparative layer chromatography, 140 mg. of 11$\beta$,16-$\beta$-dihydroxy-17$\alpha$-mercapto-6$\alpha$-methyl-1,4-pregnadiene-3,20-dione is obtained.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

3.7 g. of 16$\beta$-hydroxy-11$\beta$-acetoxy-17$\alpha$-mercapto-1,4-pregnadiene-3,20-dione is allowed to stand in 50 ml. of acetone with 1 ml. of 70% strength perchloric acid for 1 hour at room temperature. The reaction product is introduced into ice water the precipitate is vacuum-filtered and dried. After chromatography on silica gel with 8–10% acetone/methylene chloride, 1.7 g. of 11$\beta$-acetoxy-2',2'-dimethyl-1,4-pregnadieno[17,16$\alpha$-d]-1',3'-oxathiolane-3,20-dione is obtained as an oil.

EXAMPLE 2

1.6 g. of 11$\beta$-acetoxy-2',2'-dimethyl-1,4-pregnadieno-[17,16$\alpha$-d]-1',3'-oxathiolane-3,20-dione is allowed to stand in 50 ml. of 0.2N methanolic potassium hydroxide solution for 12 hours at room temperature and under a nitrogen atmosphere. The reaction solution is stirred into ice water containing hydrogen chloride. The reaction product is extracted with methylene chloride, the solution is washed neutral. After chromatography on silica gel with 5–8% acetone/methylene chloride and recrystallization from acetone/hexane, the thus-obtained product is 700 mg. of 11-$\beta$-hydroxy-2',2'-dimethyl-1,4-pregnadieno[17,16$\alpha$-d]-1',3'-oxathiolane-3,20-dione, m.p. 297° C. (decomposition).

EXAMPLE 3

One gram of 11$\beta$-hydroxy-2',2'-dimethyl-1,4-pregnadieno[17,16$\alpha$-d]-1',3'-oxathiolane-3,20-dione is combined, in 40 ml. of acetone distilled over potassium permanganate, with 0.9 ml. of 8N chromosulfuric acid solution and stirred 1 hour at room temperature. The solution is poured into ice water; the thus-precipitated product is vacuum-filtered and dissolved in ethyl acetate, again precipitated, washed with water, and dried. After recrystallization from acetone/hexane, 380 mg. of 2',2'-dimethyl-1,4-pregnadieno[17,16$\alpha$-d]-1',3+-oxathiolane-3,11,20-trione is obtained, m.p. 234°–238° C. (decomposition).

EXAMPLE 4

6.1 g. of 9-fluoro-11$\beta$,16$\beta$-dihydroxy-17$\alpha$-mercapto-4-pregnene-3,20-dione is mixed with 50 ml. of acetone and 0.5 ml. of 70% perchloric acid and allowed to stand at room temperature for 3 hours. The reaction solution is then stirred into ice water, the precipitate is vacuum-filtered and dried. After chromatography with 2.5 - 5.5% acetone/methylene chloride, 2 g. of 9-fluoro-11$\beta$-hydroxy-2',2'-dimethyl-4-pregneno[17,16$\alpha$-d]-1',3'-oxathiolane-3,20-dione is obtained as an oil.

EXAMPLE 5

700 mg. of 9-fluoro-11$\beta$-hydroxy-2',2'-dimethyl-4-pregneno[17,16$\alpha$-d]-1',3'-oxathiolane-3,20-dione is refluxed in 70 ml. of dioxane with 700 mg. of 2,3-dichloro-5,6-dicyano-1,4-benzoquinone for 3 hours. The solvent is distilled off under vacuum, the residue is washed repeatedly with dilute sodium hydroxide solution, and taken up in ether. The crude product is purified by preparative layer chromatography, thus obtaining 180 mg. of 9-fluoro-11$\beta$-hydroxy-2',2'-dimethyl-1,4-pregnadieno[17,16$\alpha$-d]-1',3'-oxathiolane-3,20-dione in the form of an oil.

EXAMPLE 6

110 mg. of crude 6$\alpha$-fluoro-11$\beta$,16$\beta$-dihydroxy-17$\alpha$-mercapto-1,4-pregnadiene-3,20-dione is mixed in 1.5 ml. of acetone with 0.02 ml. of 70% perchloric acid. After 2 hours, the reaction solution is neutralized and the solvent distilled off under vacuum. After purifying the reaction product by preparative layer chromatography, 85 mg. of 6$\alpha$-fluoro-11$\beta$-hydroxy-2',2'-dimethyl-1,4-pregnadieno[17,16$\alpha$-d]-1',3'-oxathiolane-3,20-dione is obtained in the form of an oil.

EXAMPLE 7

140 mg. of 11$\beta$,16$\beta$-dihydroxy-17$\alpha$-mercapto-6$\alpha$-methyl-1,4-pregnadiene-3,20-dione is combined in 1.5 ml. of acetone with 0.02 ml. of 70% perchloric acid. After 3 hours, the solution is neutralized and the solvent distilled off under vacuum. After the crude product has been purified by preparative layer chromatography and recrystallization from acetonehexane, the product is 65 mg. of 11$\beta$-hydroxy-2',2',6$\alpha$-trimethyl-1,4-pregnadieno[17,16$\alpha$-d]-1',3'-oxathiolane-3,20-dione, m.p. 253°–255° C.

EXAMPLE 8

1.3 g. of 16$\beta$-hydroxy-11$\beta$-acetoxy-17$\alpha$-mercapto-1,4-pregnadiene-3,20-dione is allowed to stand at room temperature under a nitrogen atmosphere for 3 hours in 10 ml. of acetophenone, while adding 0.2 ml. of 70% perchloric acid. Then, the reaction mixture is diluted with ethyl acetate and the solution washed neutral. After steam distillation, the mixture of epimers is separated by preparative layer chromatography with ether/chloroform (8:2), thus isolating 35 mg. of 11β-acetoxy-(2'S)-2'-methyl-2'-phenyl-1,4-pregnadieno[17,16α-d]-1',3'-oxathiolane-3,20-dione and, as the more polar component, 130 mg. of 11β-acetoxy-(2'R)-2'-methyl-2'-phenyl-1,4-pregnadieno[17,16α-d]-1',3'-oxathiolane-3,20-dione as an oil.

EXAMPLE 9

A solution of 1.0 g. of 11β-hydroxy-2',2'-dimethyl-1,4-pregnadieno[17,16α-d]-1',3'-oxathiolane-3,20-dione in 10 ml. of pyridine is combined with a mixture of 1.1 g. of chromium(VI) oxide in 10 ml. of pyridine. The reaction mixture is maintained at room temperature for 20 hours, then poured onto ice water and extracted with ethyl acetate. The extracts are washed neutral in water, dried with Na₂SO₄, and evaporated under vacuum. After recrystallization from acetone/hexane, 250 mg. of 2',2'-dimethyl-1,4-pregnadieno[17,16α-d]-1',3'-oxathiolane-3,11,20-trione is obtained, m.p. 232.5° – 237° C. (decomposition).

EXAMPLE 10

A solution of 700 mg. of 9α-fluoro-11β-hydroxy-2',2'-dimethyl-4-pregneno [17,16α-d]-1',3'-oxathiolane-3,20-dione and 400 mg. of selenium dioxide in 60 ml. of tert.-butanol is refluxed, after adding 0.10 ml. of pyridine, for 72 hours. The reaction solution is filtered, the filtrate evaporated under vacuum, the residue is dissolved in ethyl acetate, washed with sodium bicarbonate solution and water, and taken up in ether. The crude product is purified by preparative layer chromatography, thus producing 9α-fluoro-11β-hydroxy-2',2'-dimethyl-1,4-pregnadieno[17,16α-d]-1',3'-oxathiolane-3,20-dione in the form of an oil.

EXAMPLE 11

1.4 g. of 11β-hydroxy-2',2'-dimethyl-1,4-pregnadieno[17,16α-d]-1',3'-oxathiolane-3,20-dione is agitated overnight at 80° C. in a mixture of 15 ml. of dimethylformamide and 2.0 ml. of pyridine in 1 ml. of mesyl chloride. The reaction mixture is introduced into ice water; the precipitate is filtered off, taken up in methylene chloride, and the solution is dried. After chromatography with 6-8% acetone/hexane and recrystallization from acetone/hexane, 488 mg. of 2',2'-dimethyl-1,4,9(11)-pregnatrieno[17,16α-d]-1',3'-oxathiolane-3,20-dione is obtained, m.p. 223°–225° C.

EXAMPLE 12

1.8 g. of 2',2'-dimethyl-1,4,9(11)-pregnatrieno[17,16α-d]-1',3'-oxathiolane-3,20-dione is combined at room temperature, in a mixture of 4 ml. of dioxane and 1.5 ml. of water, with 1.8 g. of N-bromosuccinimide and 0.1 ml. of 70% perchloric acid. After 2.5 hours, the solution is introduced into ice water, the precipitate is vacuum-filtered and taken up in methylene chloride. The solution is washed successively with sodium thiosulfate solution and water. After evaporation of the solution, the product is 1.2 g. of 9-bromo-11β-hydroxy-2',2'-dimethyl-1,4-pregnadieno[17,16α-d]-1',3'-oxathiolane-3,20-dione which is refluxed for 2 hours as the crude product with 1.5 g. of potassium acetate in 8 ml. of ethanol. The reaction mixture is introduced into ice water, the precipitate is vacuum-filtered, dried, and chromatographed on silica gel with 4–7% of acetone/methylene chloride. After recrystallization from acetone/hexane, 410 mg. of 9,11β-epoxy-2',2'-dimethyl-1,4-pregnadieno[17,16β-d]-1',3'-oxathiolane-3,20-dione is obtained, m.p. 270°–274° C. (decomposition).

EXAMPLE 13

At 0° C., gaseous hydrogen chloride is introduced into a solution of 385 mg. of 9,11β-epoxy-2',2'-dimethyl-1,4-pregnadieno[17,16α-d]-1',3'-oxathiolane-3,20-dione in 10 ml. of methylene chloride. After 50 minutes, the reaction mixture is slowly stirred into ice water containing soduim bicarbonate. The precipitate is vacuum-filtered, taken up in methylene chloride, and the solution is dried. After purification of the crude product by preparative layer chromatography, 85 mg. of 9-chloro-11β-hydroxy-2',2'-dimethyl-1,4-pregnadieno[17,16α-d]-1',3'-oxathiolane-3,20-dione is obtained in the form of an oil.

EXAMPLE 14

1.1 g. of 16β-hydroxy-11β-acetoxy-17α-mercapto-1,4-pregnadiene-3,20-dione is allowed to stand under a nitrogen atmosphere at room temperature overnight in 10 ml. of 2-acetylthiophene with the addition of 0.2 ml. of 70% perchloric acid. The solution is diluted with ethyl acetate and neutralized with sodium bicarbonate solution. After steam distillation, the epimeric mixture is separated by preparative layer chromatography with ether/chloroform (8:2), thus obtaining 35 mg. of 11β-acetoxy-(2'S)-2'-methyl-2'-thienyl-1,4-pregnadieno[17,16α-d]-1',3'-oxathiolane-3,20-dione and 92 mg. of 11β-acetoxy-(2'R)-2'-methyl-2'-thienyl-1,4-pregnadieno[17,16α-d]-1',3'-oxathiolane-3,20-dione as an oil.

EXAMPLE 15

930 mg. of 16β-hydroxy-11β-acetoxy-17 α-mercapto-1,4-pregnadiene-3,20-dione is allowed to stand in 10 ml. of cyclohexanone for 15 hours at room temperature with the addition of 100 mg. of p-toluenesulfonic acid. The reaction mixture is diluted with ethyl acetate, neutralized with sodium bicarbonate solution, and the largest portion of cyclohexanone is removed by steam distillation. The crude product is purified by preparative layer chromatography with ether/chloroform (8:2), thus producing 72 mg. of 11β-acetoxy-2',2'-pentamethylene-1,4-pregnadieno[17,16α-d]-1',3'-oxathiolane-3,20-dione as an oil.

EXAMPLE 16

0.9 g. of 9-fluoro-11β,16β-dihydroxy-17α-mercapto-4-pregnene-3,20-dione is combined with 10 ml. of acrolein and 0.1 ml. of 70% perchloric acid and agitated for 3 hours at room temperature. The reaction solution is stirred into ice water; the precipitate is vacuum-filtered and dried. After chromatography on silica gel with 6–8% acetone/methylene chloride, the product thus obtained is 325 mg. of 9-fluoro-11β-hydroxy-2'-vinyl-4-pregneno[17,16α-d]-1',3'-oxathiolane-3,20-dione.

EXAMPLE 17

3.1 g. of 9-fluoro-11β,16β-dihydroxy-17α-mercapto- 4-pregnene-3,20-dione is mixed with 25 ml. of methyl propyl ketone and 0.5 ml. of 70% perchloric acid and allowed to stand for 5 hours at room temperature. The reaction solution is stirred into ice water; the precipitate is vacuum-filtered and dried. After chromatography with 2.5 – 5.5% acetone/methylene chloride, 800 mg. of 9-fluoro-11β-hydroxy-2′-methyl-2′-propyl-4-pregneno[17,16α-d]-1′,3′-oxathiolane-3,20-dione is obtained in the form of an oil.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. 11-oxygenated pregneno [17,16α-d]-1′,3′-oxathiolanes of the Formula I

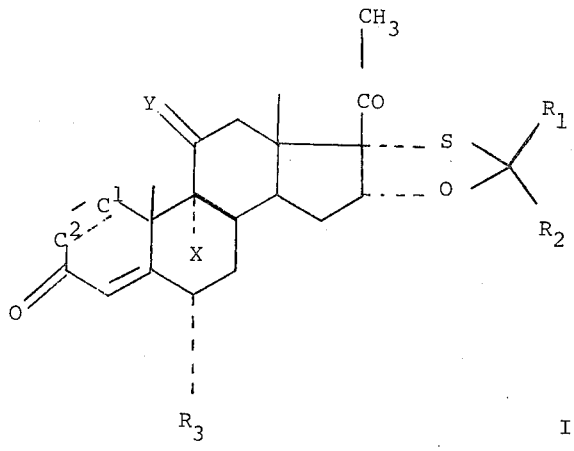

wherein $R_1$ and $R_2$, can be the same or different and are a hydrogen atom, a saturated or unsaturated alkyl of 1–5 carbon atoms, a cycloalkyl, a cycloalkyl of 3–8 carbon atoms, phenyl, or thienyl; $R_1$ and $R_2$ together can be a $(CH_2)_n$ bridge wherein n has the values of 2–6; $R_3$ represents a hydrogen or fluorine atom, or methyl; X is a hydrogen, fluorine, or chlorine atom; Y is an oxygen atom or the group

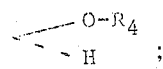

wherein $R_4$ represents a hydrogen atom or an alkanoyloxy of 1–4 carbon atoms; and $C^1 = C^2$ represents a single or double bond between the C-1 and C-2 carbon atoms.

2. A compound of claim 1, 11β-acetoxy-2′,2′-dimethyl-1,4-pregnadieno-[17,16α-d]-1′,3′-oxathiolane-3,20-dione.

3. A compound of claim 1, 11β-hydroxy-2′,2′-dimethyl-1,4-pregnadieno[17,16α-d]-1′,3′-oxathiolane-3,20-dione.

4. A compound of claim 1, 2′,2′-dimethyl-1,4-pregnadieno[17,16α-d]-1′,3′-oxathiolane-3,11,20-trione.

5. A compound of claim 1, 9α-fluoro-11β-hydroxy-2′,2′-dimethyl-4-pregnenol[17,16α-d]-1′,3′-oxathiolane-3,20-dione.

6. A compound of claim 1, 9α-fluoro-11β-hydroxy-2′,2′-dimethyl-1,4-pregnadieno[17,16α-d]-1′,3′-oxathiolane-3,20-dione.

7. A compound of claim 1, 6α-fluoro-11β-hydroxy-2′,2′-dimethyl-1,4-pregnadieno[17,16α-d]-1′,3′-oxathiolane-3,°-dione.

8. A compound of claim 1, 11α-hydroxy-2′,2′,6α-trimethyl-1,4-pregnadieno[17,16α-d]-1′,3′-oxathiolane-3,20-dione.

9. A compound of claim 1, 11β-acetoxy-2′-methyl-2′-phenyl-1,4-pregnadieno[17,16α-d]-1′,3′-oxathiolane-3,20-dione.

10. A compound of claim 1, 9α-chloro-11β-hydroxy-2′,2′-dimethyl-1,4-pregndieno[17,16α-d]-1′,3′-oxathiolane-3,20-dione.

11. A compound of claim 1, 11β-acetoxy-2′-methyl-2′-thienyl-1,4-pregnadieno[17,16α-d]-1′,3′-oxathiolane-3,20-dione.

12. A compound of claim 1 wherein 11β-acetoxy-2′,2′-pentamethylene-1,4-pregnadieno-[17,16α-d]-1′,3′-oxathiolane-3,20-dione.

13. A compound of claim 1, 9α-fluoro-11β-hydroxy-2′-vinyl-4-pregneno[17,16α-d]-1′,3′-oxathiolane-3,20-dione.

14. A compound of claim 1, 9α-fluoro-11β-hydroxy-2′-methyl-2′-propyl-4-pregneno[17,16α-d]-1′,3′-oxathiolane-3,20-dione.

* * * * *

UNITED STATES PATENT OFFICE
CERTIFICATE OF CORRECTION

PATENT NO. : 3,894,004
DATED : July 8, 1975
INVENTOR(S) : Hofmeister, Helmut; et al It is certified that error appears in the above-identified patent and that said Letters Patent are hereby corrected as shown below:

Title; -1,3- should be changed to --1',3'--

Abstract; line 6 from last change "$C^1....C^2$" to --$C^1\underline{....}C^2$--.

Claim 5; line 2 change "pregnenol" to --pregneno--.

Claim 7; line 3 change "3,°" to --3,20--.

Claim 8; line 1 change "11α" to --11β--.

Signed and Sealed this twenty-eight Day of October 1975

[SEAL]

Attest:

RUTH C. MASON
Attesting Officer

C. MARSHALL DANN
Commissioner of Patents and Trademarks